No. 775,575. PATENTED NOV. 22, 1904.
J. H. MASSMANN.
COMBINED LAND ROLLER AND HARROW.
APPLICATION FILED MAR. 19, 1904.
NO MODEL. 2 SHEETS—SHEET 1.
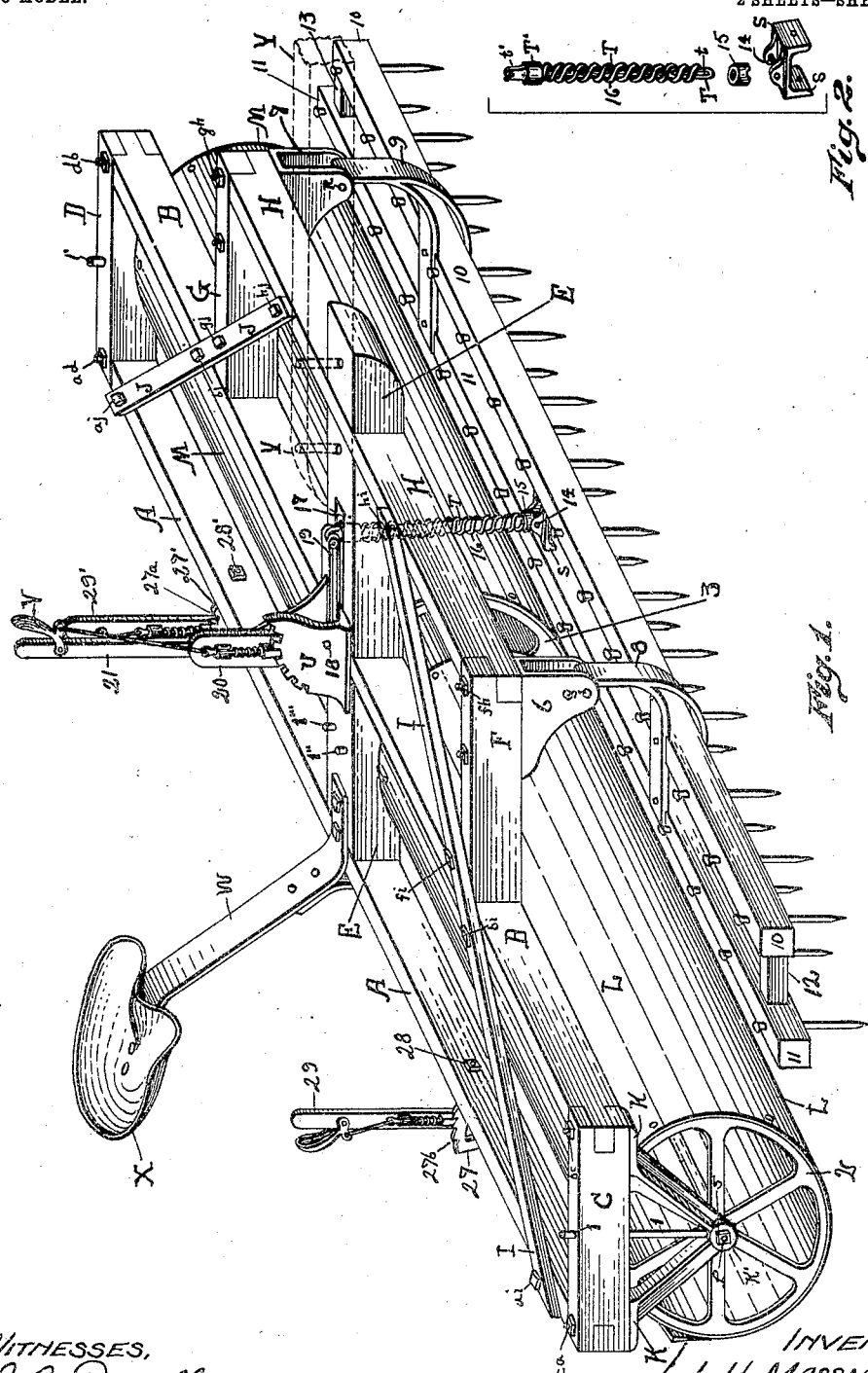
WITNESSES,
S. C. Duvall.
R. E. Randle.
INVENTOR,
J. H. MASSMANN;
by his attorney,
Robert W. Randle.

No. 775,575. PATENTED NOV. 22, 1904.
J. H. MASSMANN.
COMBINED LAND ROLLER AND HARROW.
APPLICATION FILED MAR. 19, 1904.
NO MODEL. 2 SHEETS—SHEET 2.

WITNESSES,
S. C. Duvall.
R. J. Randle.

INVENTOR,
J. H. MASSMANN,
by his attorney,
Robert W. Randle.

No. 775,575. Patented November 22, 1904.

UNITED STATES PATENT OFFICE.

JOHN H. MASSMANN, OF RICHMOND, INDIANA.

COMBINED LAND ROLLER AND HARROW.

SPECIFICATION forming part of Letters Patent No. 775,575, dated November 22, 1904.

Application filed March 19, 1904. Serial No. 198,906. (No model.)

*To all whom it may concern:*

Be it known that I, JOHN H. MASSMANN, a citizen of the United States, residing at Richmond, in the county of Wayne and in the State of Indiana, have invented new and useful Improvements in a Combined Land Roller and Harrow, of which the following is a full, complete, and lucid specification, such as will enable others familiar with the art to which it appertains to make and use the same.

This present invention relates to agricultural implements, and particularly to that class intended for preparing the soil subsequent to plowing, preparatory to planting the seeds therein, and also, if desired, for working the ground after the plants are up or for other analogous purposes which may come within the province of the machine.

The object of my present invention, broadly speaking, is the combining of a land-roller and a land-harrow into one implement or machine to be operated together at one and the same time, or separately, if desired.

A more specific object is the provision of a combined land roller and harrow to be drawn by two or more horses or other motive power, to be managed and controlled by a single attendant or driver.

A further object is the provision of a combined land roller and harrow, with provisions for the driver to ride thereon, means whereby the working depth of the harrow and the cleaning or scraping of the surfaces of the rollers are at all times under easy control of the driver, and with means whereby the harrow may be entirely lifted from and carried above the surface of the ground; and, finally, a still further object is to provide a new article of manufacture, a combined roller and harrow which can be made and sold at a comparatively low price, which will be comparatively easy of operation and propulsion, will consist of a minimum of mechanical parts, will be strong and durable in construction, and to generally improve the construction and operation of machines of this character.

For a more full and complete understanding of this present invention reference is had to the accompanying drawings, in which—

Figure 3:
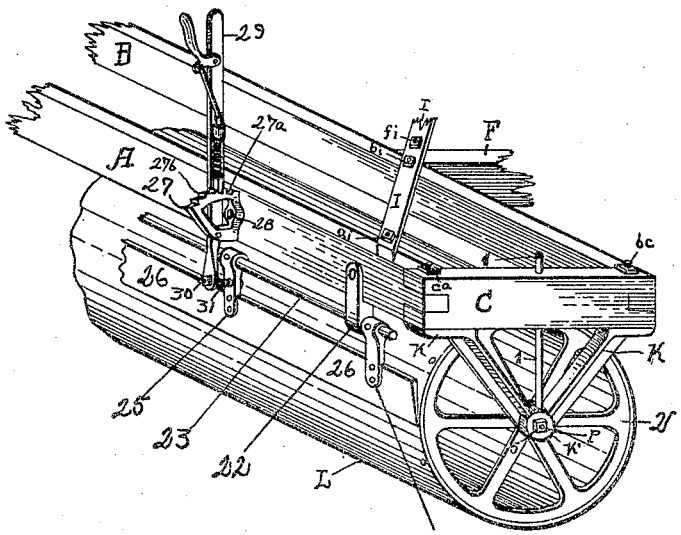
Figure 4:
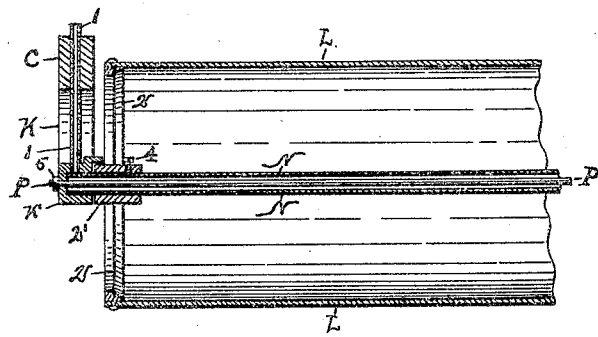

Figure 1 is a front isometrical view of my entire invention. Fig. 2 shows details of a portion of the harrow-operating mechanism. Fig. 3 is a rear isometrical detail showing the mechanism of one of the scrapers in its relationship with its roller; and Fig. 4 is a central section in detail, taken through a portion of one of the rollers and one of its hangers.

Similar reference characters refer to and denote like parts throughout the several views of the drawings.

In order that the construction and operation of my invention will be clearly understood, I will now take up the description thereof in detail, which I will refer to and describe as briefly and compactly as I may.

*The roller-frame.*—This consists, essentially, of the two parallel sills A and B, spaced apart, united at their ends by the cross-sills C and D, united in the center by the draft-sill E, which latter extends forward some distance ahead of the sill B, as will presently be explained. The ends of the members A and B are in connection with the ends of the members C and D, as shown, and said parts are then secured together by the four bolts *bc, ca, ad*, and *db*, passing vertically through the respective united ends, as shown in the drawings. The draft-sill E is connected to the center of the sill A by a tenon and mortise formed in the usual manner and is halved with the member B at their crossing-point. By the above it will be observed that I form a rigid frame to be further secured, as will presently appear.

*The harrow-frame.*—As before indicated, the draft-sill E extends forward some distance ahead of the roller-frame, whereby it contributes to the support and rigidity of the harrow-frame, which I will now describe. The letters F and G denote the end members of the harrow-frame. The rear ends of said members are connected to the forward face of the member B at points equidistant between the ends of the member B and the member E. Uniting the forward ends of the members F and G is the member H, (parallel with the member B,) its ends being halved with the forward ends of the members F and G and secured in connection therewith by the bolts *fh* and *gh*, and the member H is halved with the member E at their crossing-point, as is indicated in the drawings.

*The framework collectively.*—Taken together, it will be observed that the roller-frame and the harrow-frame are rigidly connected, with all of the members thereof flush with each other both on the upper and lower surfaces. To further strengthen the combined framework, I provide a pair of braces I and J, extending from near the respective ends of the sill A across the sill B and the respective members F and G to the member H to the points approximately midway between the ends and the center of the member H. Said brace I is disposed on the top of said members A, B, F, and H and is secured thereto by the respective bolts *ai*, *bi*, *fi*, and *hi*, and the said brace J is disposed on top of said members A, B, G, and H and is secured thereto by the respective bolts *aj*, *bj*, *gj*, and *hj*, all substantially as shown.

*The rollers and mountings.*—The letter K denotes a V-shaped hanger, (shown in Figs. 1 and 3,) having a pair of feet to contact with the under surface of the member C and secured thereto by the said bolts *ca* and *bc*. Said hanger has a stationary bearing in its vertex, formed by the union of its arms, with an interior bearing-cavity with a closed outer end or cap. Extending vertically into the center of the bearing K' is an aperture to receive the lower end of the oil-tube 1, which latter extends up through an aperture in the member C. A hanger (not shown) identical with the above is in like manner secured on the under surface of the member D by the bolts *ad* and *db*, with an oil-tube 1' extending up from its bearing-cavity. Also two other hangers (not shown, but identical with that described) are secured near each other on the under side of the member E, each being provided with an oil-tube 1" and 1''', respectively, which extends up from their bearing-cavity like unto that described. It will be manifest that the four hangers K should be on alinement with each other for the reason which will now be made apparent. In this construction I provide two rollers which are identical in composition, each having the two end members or wheels 2 on the right-hand roller and 3 on the left-hand roller, (only the one on the right-hand end of each of the rollers appearing in the drawings,) which are spaced apart, each pair having its two end members the predetermined distance apart to form the rollers of requisite length. The rollers proper are formed of a rather heavy sheet-metal drum, (denoted by the letters L and M,) with their ends secured to the peripheries of the respective wheels 2 and 3, substantially as indicated in the drawings.

Each of the four wheels 2 and 3 (two of them not appearing in the drawings) has a central hub, as indicated by the character 2' in Fig. 4, with an inner and an outer projecting flange portion and with a central horizontal aperture therethrough of substantially the same size as said bearing-cavity in the hangers. Each of the two rollers is provided each with a central pipe-axle, as indicated by the letter N in Fig. 4, the ends of which axles pass through the said apertures in the hubs 2' and neatly fill the cavity of the bearing K'. Through the inner flanges of the hubs 2 is disposed a set-screw 4, by which said axle N is securely locked in the position shown in Fig. 4 in relation with the rollers. In an axial direction through the center of each of the bearings K' is an aperture, and each pair of hangers is secured from spreading apart by a rod, as the rod P in Fig. 4, the threaded ends of which extend through said apertures in the bearing K', with a nut 5 (shown in Figs. 1, 3, and 4) threaded thereon.

*The harrow.*—On the under side of the forward ends of the members F and G is a double hanger 6 and 7, respectively, secured thereto by said bolts *fh* and *gh*, as shown in Fig. 1. Figs. 8 and 9 denote each an angular three-part arm having its upper end pivoted between the members of the respective hangers 6 and 7 by the respective pivots Q and R, and from thence they extend downward and rearward, dividing into two branches, substantially as shown. Figs. 10 and 11 denote the harrow-sills, which are at all times parallel to said rollers and are bolted a distance apart between the two branches of each of the arms 8 and 9. The length of the sills 10 and 11 is substantially the same as the combined length of the two rollers, and the ends of said sills are connected together by cross-ties 12 and 13. Each of the sills 10 and 11 is provided with a plurality of vertically-disposed teeth, having downwardly-projecting points, as shown, which operate in the usual manner.

*Means for controlling the harrow.*—Secured to and between and in the center longitudinally of the sills 10 and 11 is the block S, having a central aperture therethrough, with a pair of ears extending up on the right and left of said aperture, with oppositely-disposed pivot-apertures through said ears to receive a pivot 14. The letter T denotes a rod having a longitudinal slot *t* throught its lower portion and a head T' formed integral with its upper end and having a pivot-bearing lug *t'* extending up from said head, all as shown in Fig. 2. The numeral 15 denotes a thimble adapted to rest centrally on the pivot 14 and with an aperture therethrough to receive the rod T. Surrounding the rod T is a helical spring 16. It will now be seen that said parts may be assembled as follows: I first remove the pivot 14, then insert the lower end of the rod T through the thimble 15, pressing said thimble up against the resiliency of the spring 16, the upper end of said spring being seated against the head T', then insert the lower end of the rod T down through said aperture in the block S, and then insert the pivot 14 through the said apertures in said ears of the block, allowing it to pass through the slot $t$ of the rod T. I then allow the thimble 15 to rest on the pivot 14, held thereto by the spring 16. Through the central portion of the member E is a vertical longitudinal slot 17, through which the upper portion of the rod T extends, as shown. Mounted on the top of and at the intersections of the members B and E, over and in the rear of the slot 17, is the double-sided member U, one of its sides being formed in the segment of a circle, with teeth formed in its periphery, as shown. Mounted between the sides of the member U by the pivot 18 is a two-part integral member having the forwardly-extending arm 19 and the upwardly-extending arm 20, with the pivot 18 passing therethrough at their angular junction. The forward end of the arm 19 is pivoted to the lug $t'$ of the rod T, as is indicated in Fig. 1. Secured to and extending up above the arm 20 is the lever 21. A plunger is mounted to the side of the arm 20 for engagement with said teeth of the member U. A spring is provided for normally retaining said plunger in engagement with said teeth, and an auxiliary lever V is mounted to the upper portion of the lever 21, with means thereto connected for disengaging said plunger from said teeth. This construction being a common expedient a detail description thereof would be prolixity. It will now be observed that in Fig. 1 the harrow is in operative position with reference to the rollers, and it will be apparent that by the employment of the construction I have previously described the harrow may be forced up somewhat against the resiliency of the spring 16 by reason of the slot $t$ without moving vertically the rod T, and also that by moving rearward the upper portion of the lever 21 the forward end of the arm 19 will be lifted up, thereby raising endwise the rod T, and thereby lifting the harrow to any desired elevation with the limits of the movement of the lever 21.

*The scraper.*—Referring now more particularly to Fig. 3, I will describe the scrapers, one being provided for each of the rollers. Secured to the rear of and extending under the lower rear edge of the member A are a plurality of hangers 22, in which are revolubly mounted the two shafts 23, only one being shown. Adjoining each of the hangers 22 and secured to the shaft 23 are the downwardly-extending hangers 24, (only one appearing,) and similar to the hangers 24 is a central hanger 25, secured to the shaft 23 midway between each two of the hangers 24. The numeral 26 denotes the scraper proper, (one for each roller, only one appearing,) having its upper edge secured to each of the hangers 24 and 25, as shown in Fig. 3. Secured to the rear face of the member A are the two brackets 27 and 27', attached by the bolts 28 and 28', respectively, and located immediately above the respective hanger 25. The upper edge of the said brackets is formed in the segment of a circle, having on its periphery, first, a square notch $27^a$, followed by a plurality of beveled teeth $27^b$. The numerals 29 and 29' denote a lever pivoted in the lower parts of the respective brackets 27 and 27', extending below its bracket, with an aperture through its lower part to receive loosely the bolt 30. Through the center of the bracket 25 is an aperture also to loosely receive the bolt 30, and surrounding the bolt 30 between the hanger 25 and the lower end of the lever 29 is a helical spring 31. A spring-controlled plunger and means for operating same of common construction is mounted to the lever 29, as shown, whereby it will be seen that by moving the upper end of the lever 29 forward the bolt 30 will draw the scraper 26 away from its roller, which may be held in this position by allowing said plunger to engage in the notch $27^a$, and also that by releasing the plunger from the notch $27^a$ the lever may be thrown back, thus forcing the scraper 26 against its roller against the resiliency of the spring 31.

*Miscellaneous parts.*—Secured to the rear end of the member E and the center of the member A is a rearwardly and upwardly extending spring seat-post W, carrying on its upper rear portion the seat X. Secured on top of the forward portion of the member E is the tongue Y. (Shown in dotted line in Fig. 1.)

*Operation.*—It will be understood that means may be attached to the tongue Y whereby a team may be hitched to propel the roller, and the driver may be seated on the seat X. It will be seen that the driver may operate the lever 21 to raise and lower the harrow, as desired, and also that he will be in a position to operate the levers 29 and 29' for the purpose of contacting or releasing the scrapers from the rollers.

From the above description, taken in connection with the accompanying drawings, it will be apparent that I have produced an improved machine of the class stated embodying the objects otherwhere referred to in this specification.

While I have illustrated and described the best means now known to me for carrying out the objects of my invention, I desire it to be distinctly understood that I do not restrict myself to the exact details of the construction shown and described, but hold that any changes or variations in such details as would suggest themselves to the ordinary mechanic would clearly fall within the limits and scope of my invention.

Having now fully shown and described my invention, what I claim, and desire to secure by Letters Patent of the United States, is—

1. In combination with a combined land roller and harrow, a main frame, a superframe secured to and extending forward from the main frame, a cross member dividing said frame and superframe in the center, a pair of ground-rollers mounted in hangers secured to the lower faces of the main frame, a harrow mounted to and below the superframe and in front of said rollers, a spring for pressing down on the harrow, and means terminating above the frame for raising and lowering the harrow manually, all substantially as shown and described.

2. In a combined roller and harrow, a main frame and a superframe extending forward therefrom, a cross member dividing the frame and superframe, a tongue extending forward from said cross member, a seat mounted on the main frame, a pair of ground-rollers mounted between the members of the main frame, a harrow pivotally mounted to the forward member of the superframe and extending rearward in front of the ground-rollers, a lever mounted on the frame for controlling the vertical movement of the harrow, and means for retaining the harrow in resilient contact with the earth, all substantially as shown and described and for the purposes set forth.

In testimony whereof I have hereunto signed my name to this specification in the presence of two subscribing witnesses.

JOHN H. MASSMANN.

Witnesses:
R. W. RANDLE,
R. E. RANDLE.